United States Patent [19]
Makino et al.

[11] 3,822,587
[45] July 9, 1974

[54] AXIAL FORCE MEASURING METHOD UTILIZING ULTRASONIC WAVE

[75] Inventors: Takayuki Makino, Okazaki; Haruhiko Toriyama, Toyota, both of Japan

[73] Assignee: Toyota Jidosha Kogyo Kabushiki Kaisha, Toyota-cho, Toyota-shi, Japan

[22] Filed: Nov. 9, 1971

[21] Appl. No.: 196,896

[30] Foreign Application Priority Data
Nov. 24, 1970 Japan.............................. 45-103555

[52] U.S. Cl. ................ 73/67.2, 73/67.8 R, 73/88 F
[51] Int. Cl. ......................... G01h 13/00, G01l 5/12
[58] Field of Search .......... 73/67.2, 67.7, 67.8, 88 F

[56] References Cited
UNITED STATES PATENTS
2,137,852  11/1938  Nicolson ...................... 73/67.2 UX
3,153,338  10/1964  Kleesattel .......................... 73/67.1
3,306,100   2/1967  Wilhelm et al. ..................... 73/67.2

FOREIGN PATENTS OR APPLICATIONS
1,497,834   9/1967  France ................................ 73/88 F OTHER PUBLICATIONS
Ultrasonic Wave Velocity Changes with Stress, Ultrasonics, April–June 1964, p. 95.

Primary Examiner—Richard C. Queisser
Assistant Examiner—John P. Beauchamp
Attorney, Agent, or Firm—Stevens, Davis, Miller & Mosher

[57] ABSTRACT

A method of measuring the axial force of a bolt or the like from the natural frequency differential of the bolt or the like between (when the axial force is zero) and (when the axial force exists), under forced oscillation caused by an ultrasonic wave within a specific frequency range or under forced oscillation caused by ultrasonic waves within two different frequency ranges.

4 Claims, 6 Drawing Figures

AXIAL FORCE MEASURING METHOD UTILIZING ULTRASONIC WAVE

This invention relates to a method of measuring the axial forces of bolts and the like in an assembled state easily and non-destructively by using selectively ultrasonic waves within a predetermined frequency range. The invention proposes a non-destructive measuring method which can be highly effectively applied to the management of the axial forces of bolts and the like in the process of manufacture or to the measurement of said axial forces changing with the passage of time.

In the measurement of the axial forces of bolts and the like, there has generally been employed a method in which the axial force of a bolt or the like is estimated from the tightening force applied thereto. Taking a bolt as shown in FIG. 1 as an example, there is generally established the following relation between the axial force $Q$ and the tightening torque $T$ of the bolt:

$$Q = 2T/\ d(\mu_s \sec\alpha + \tan\beta) + d_N \mu_N \quad (1)$$

wherein $d$ stands for the effective diameter of the threads, $\mu_s$ the coefficient of friction of the thread surface, $\mu$ the radius of the threads, $\alpha$ the half of the apex angle of the thread, $\beta$ the lead angle of the threads, $d_N$ the mean diameter of the bolt bearing surface and $\mu_N$ the coefficient of friction of the bolt bearing surface. Namely, it will be seen that the axial force $Q$ varies depending upon the coefficient of friction of the thread surface $\mu_s$ and the coefficient of friction of the bearing surface $\mu_N$, even with the tightening force $T$ of the bolt constant. Therefore, the tightening force $T$ which can be easily measured does not always represent the exact axial force $Q$ of the bolt.

There has also been employed a method in which the axial force of a bolt or the like is determined by measuring the amount of strain in the bolt, caused by the axial force, by means of a resistance wire strain gauge. However, this method has the disadvantage that the use thereof is restricted only to the cases where a test piece is available, because a bolt must be drilled at its center or the parent metal which receives the axial force of the bolt must be worked at a specified portion, to provide for attachment of the resistance wire strain gauge.

The object of the present invention is to provide a method of measuring the axial forces of bolts and the like, which comprises measuring the strain caused in a bolt or the like by the axial force in terms of a change in the natural frequency measured by using selectively ultrasonic waves in a specific frequency range and determining the axial force of the bolt or the like based on the measured value of the natural frequency. The most important characteristic of the invention lies in the conditions under which the frequency of the ultrasonic wave used is selected.

The present invention will be described in detail hereinafter with reference to the accompanying drawings. In the drawings, FIG. 1 is a diagrammatical view illustrating the relationship between the axial force and the tightening torque of a bolt or the like;

Figure 4:
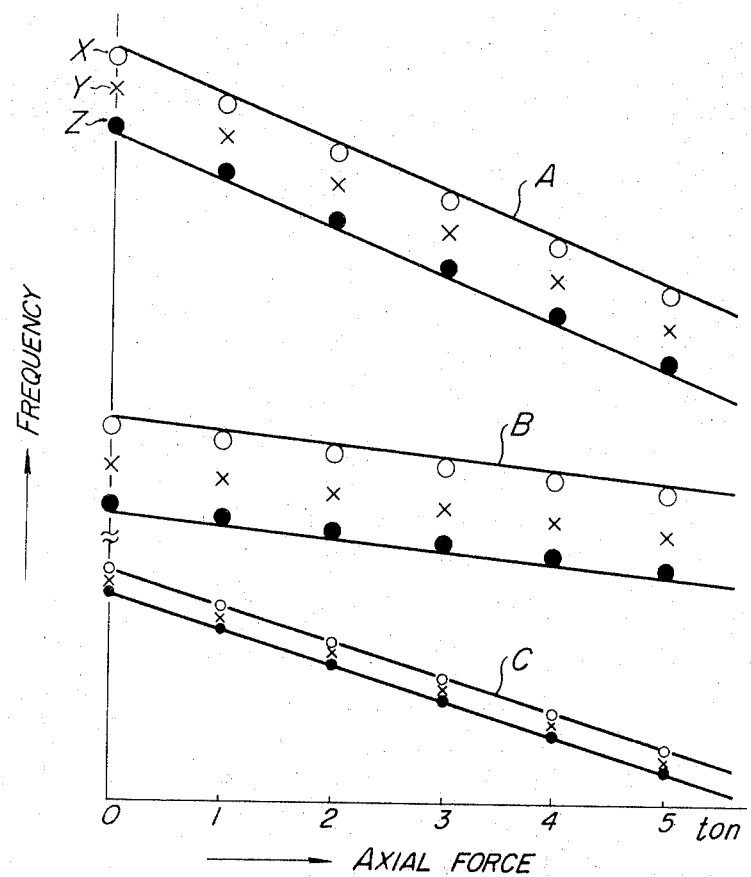
Figure 5:
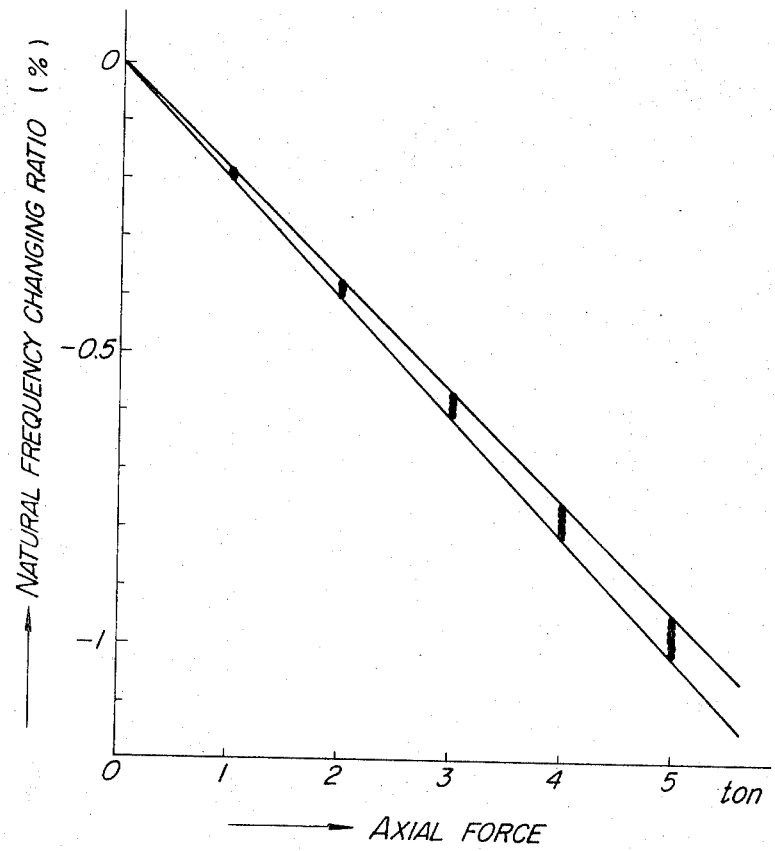

FIG. 4 is a diagram graphically showing the relationship between the axial force and the natural frequency of each of the same type of bolts for use in automobiles, established by selectively using two ultrasonic wave frequencies; and FIG. 5 is a diagram graphically exemplifying the relationship between the axial force and the rate of natural frequency change of an automobile bolt, established by selectively using one ultrasonic wave frequency.

First of all, a general method of measuring the natural frequency $f$ of an article to be measured by utilizing ultrasonic wave will be explained with reference to FIGS. 2a and 2b.

Figure 1:
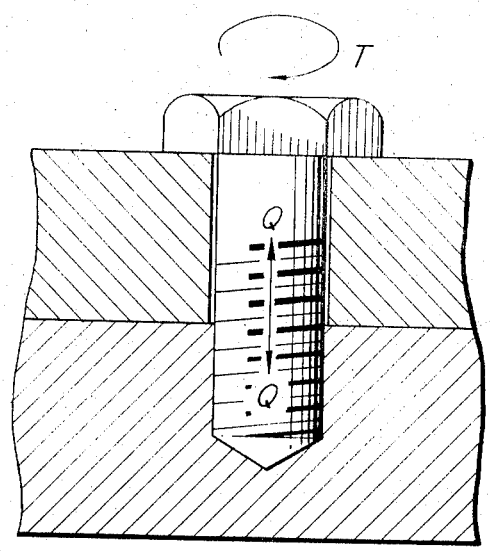
Figure 2A:
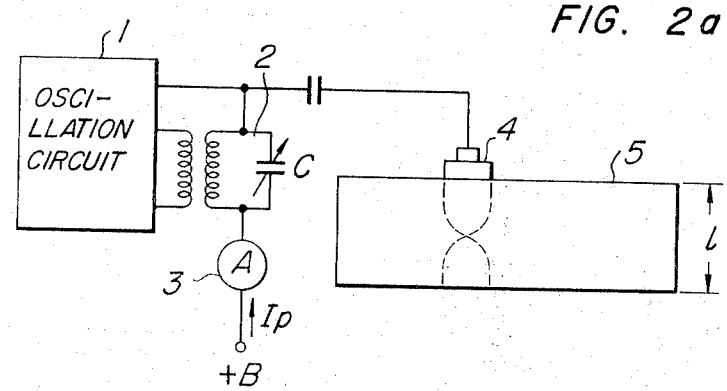
FIG. 2a is a diagram showing an example of a measuring circuit for measuring the natural frequency of an article to be measured.

Referring to FIG. 2a, reference numeral 1 designates an oscillation circuit, 2 a tuning circuit incorporated in said oscillation circuit for varying the frequency of oscillation, 3 an ammeter for indicating the current $I_p$ flowing through the oscillation circuit, 4 an ultrasonic wave oscillator consisting of crystal or barium titanate ceramic and 5 an article to be measured.

When the oscillating wave generated by the oscillation circuit 1 is applied to the ultrasonic wave oscillator 4 to radiate the ultrasonic wave to the article 5 and the oscillation frequency is varied by a variable condenser C in the tuning circuit 2, the node and antinode of the oscillating wave are formed at predetermined positions in the article as indicated by the dotted lines in FIG. 2, at a frequency at which the thickness $l$ of the article and the wave length of the ultrasonic wave in said article have a specific relation and a simple harmonic motion occurs.

This simple harmonic motion is the natural oscillation of the article, and with $l$ representing the thickness of the article and $v$ representing the propagation speed in the article, the natural frequency $f$ can be generally calculated from the following formula:

$$f = n \cdot v / 2l \quad (2)$$

wherein $n$ is a positive integer, and when $n = 1$, $f$ represents the basic frequency and when $n = 2, 3, ...$, $f$ represents a multiple frequency.

Figure 2B:
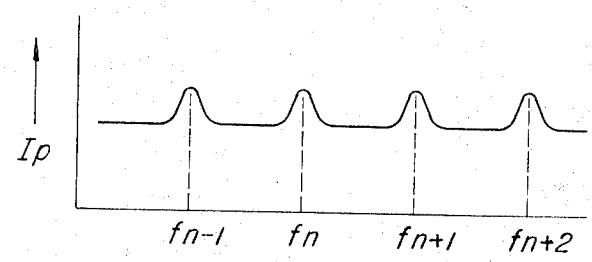
FIG. 2b is a diagram showing a current fluctuation in the oscillation circuit at the time of resonance.

The natural frequency $f$ thus generated can be measured in terms of a change of the current value $I_p$ indicated by the ammeter 3, as shown in FIG. 2b. Namely, when the oscillation frequency is gradually changed by the variable condenser C of the tuning circuit 2, resonance occurs in the article at the natural frequency $f$ and the current $I_p$ increases. Therefore, the basic frequency $f_1$ and multiple frequencies $f_2, f_3, ..... f_n$ of the article can be readily read on a scale of the oscillation frequency $f_c$ previously scaled relative to the capacity of the variable condenser C. The basic frequency $f_1$, as will be understood from equation (2) above, is represented by $$f_1 = f_{n+1} - f_n \quad (3)$$

and, therefore, can be determined by measuring adjacent two multiple frequencies.

The natural frequency $f$ is given by equation (2) above but, when $n = 1$, the following equation results:

$$f = v/2l = \sqrt{E/\rho}/2l = \sqrt{EV/M}/2l \quad (4)$$

wherein $E$ is the Young's modulus, $\rho$ is the density, $M$ is the mass and $V$ is the volume of the article.

Namely, it will be understood that the natural frequency $f$ is in inverse proportion to the thickness $l$ of the article and in proportion to the square root of the volume $V$ and the Young's modulus of the same.

Now, a discussion will be made on the natural frequency change resulting from occurrence of a strain in an article to be measured. When a load is exerted, for example, on a cylindrical body to cause a tensile strain $\epsilon$, the changing ratio of the natural frequencies before and after the exertion of load is represented by the following formula, provided that the Young's modulus $E$ and the mass $M$ of the cylindrical body are constant:

$$(f - f_o)/f_o = \sqrt{V/V_o}/(l/l_o) - 1$$
$$= (1 - \nu\epsilon)/\sqrt{1 + \epsilon} - 1 \quad (5)$$

wherein $f_o$ and $f$ stand for the natural frequencies before and after the strain $\epsilon$ is imparted to the cylindrical body; $l_o$ and $l$, $V_o$ and $V$, the lengths and the volumes respectively, of the cylindrical body before and after the strain $\epsilon$ is imparted to the cylindrical body; and $\nu$ the Poisson's ratio.

In the case when a tensile stress of 0.3 percent occurred in the cylindrical body, the natural frequency changing ratio can be determined as follows based on the Poisson's ratio $\nu = 0.3$;

$$(f - f_o)/f_o = (1 - 0.3 \times 0.003)/\sqrt{1 + 0.003} - 1$$
$$\approx -0.0024 \quad (6)$$

and it will be seen that the natural frequency is lowered by 0.24 percent as a result of occurrence of 0.3 percent tensile strain.

Further, the changing ratio of the natural frequencies $f_1$ and $f_2$ in the case of the strain being $\epsilon_1(\epsilon_1 < 0)$ and $\epsilon_2(\epsilon_2 > 0)$ is represented by the following formula:

$$(f - f)/f = (1 - \nu\epsilon_2)\sqrt{1 + \epsilon_1}/$$
$$(1 - \nu\epsilon_1)\sqrt{1 + \epsilon_2} - 1 \quad (7)$$

The present inventors, in the process of analyzing the relationship between the actually measured values and the calculated values based on the above theoretical basis, found that there occurs an entirely new phenomenon that the frequency values $f_1$ and $f_2$ vary drastically according to the frequency of the ultrasonic wave used in the measuring.

Namely, it was noted that while the relationships represented by equations 5 and 6 are established as long as the frequency of the ultrasonic wave used in the measuring is lower than some 2 or 3 MHz, the changing ratio of the frequency increases steeply as the strain $\epsilon$ increases when the ultrasonic frequency value used exceeds several MHz.

Figure 3:
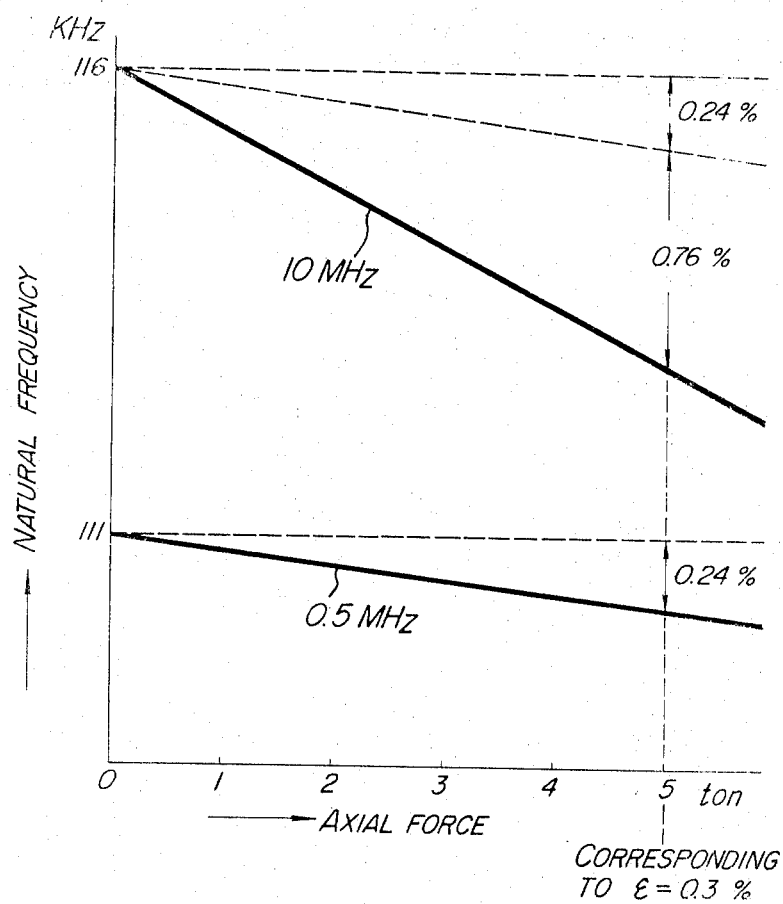
FIG. 3 is a diagram exemplifying graphically the relationship between the axial force and the natural frequency of a specific bolt for use in automobiles, established by selectively using two ultrasonic wave frequencies.

With reference to FIG. 3 there is shown a representative example of the results of the experiments conducted on a ring gear setting bolt (10 mm in diameter and 25 mm in length) for use in automobiles. The axis of abscissa is scaled by axial force and the axis of ordinate by natural frequency. It will be seen from the diagram that while the actual values are very close to the natural frequency changing ratio (0.24 percent) calculated from equation (6) above when an ultrasonic wave of a frequency of about 0.5 MHz is used, the actual frequency changing ratio obtained from the actual values is much larger than that obtained from the theoretical equation when an ultrasonic wave of a frequency of about 10 MHz is used.

More specifically, when the axial force is zero, the value of the natural frequency measured by applying 10 MHz of ultrasonic frequency is 5 percent larger than the value of the natural frequency measured by applying 0.5 MHz of the ultrasonic frequency, and the natural frequency changing ratio, in the case of a strain of 0.3 percent (corresponding to an axial force of 5 tons), is about 1 percent which is larger than the calculated value of 0.24 percent. This phenomenon has been confirmed upon detail review of the experimental results on various types of bolts, namely it was confirmed that within the ultrasonic frequency range below 2 or 3 MHz, the characteristic shown in FIG. 3 as obtainable in the case of using an ultrasonic wave of a frequency of about 0.5 MHz can be obtained, whereas within the ultrasonic frequency range above several MHz, the characteristic shown in FIG. 3 as obtainable in the case of using an ultrasonic wave of a frequency of about 10 MHz can be obtained.

FIG. 4 shows by way of example the relationships between the axial force and the natural frequency, actually measured on 50 ring gear setting bolts for automobiles by using ultrasonic frequencies of about 0.5 MHz and about 10 MHz. The vertical axis represents the frequency, and the abscissa indicates the readings of the tensile tester or any other mechanical equipment which can indicate the axial force within the article. In the diagram, characters A and B represent the data measured by using ultrasonic waves of frequencies of about 10 MHz and 0.5 MHz respectively, and character C represents a graph obtained by subtracting the data of B from the data of A. In each of the graphs A, B and C, the data of three representative bolts X, Y and Z located at the upper limit, the middle portion and the lower limit thereof are indicated by $o$, $x$ and respectively.

It is considered that the fluctuations which occur among the measured values of several articles, such as the values of X, Y and Z, is attributable to the irregularities in length, heat-treating conditions and concentrations of ingredients of the bolt. Such tendency of fluctuation is observed in either case when the ultrasonic wave of a frequency of about 10 MHz is used or when the ultrasonic wave of a frequency of 0.5 MHz is used. Therefore, by drawing a graph by plotting the differences between the values obtained by using the ultrasonic wave of a frequency of about 10 MHz and the values obtained by using the ultrasonic wave of a frequency of about 0.5 MHz, on each bolt, the fluctuation can be decreased as shown by the graph C in FIG. 4.

It will be obviously understood that by measuring the natural frequencies of a bolt by using the two ultrasonic waves of frequencies of about 10 MHz and 0.5 MHz according to the above-described method, calculating the difference between the measured values of natural frequencies and comparing the calculated difference with a calibration curve previously drawn on the bolt, the value of the axial force of said bolt can be readily obtained. Namely, the axial force of the bolt can be readily, simply and non-destructively determined in its assembled state, without the necessity of previously measuring the natural frequency of the bolt before it is tightened. Thus, the method of this invention has a wide range of application.

On the other hand, where the natural frequency of a bolt can be measured before the bolt is assembled, i.e. in the state of the axial force being zero, the axial force of the bolt in an assembled state can be readily determined from a calibration curve which can be obtained by using a tensile tester or such on a great number of bolts prior to the present measuring, by calculating the changing ratio of the natural frequencies of the bolt before and after the assembly. In this case, the axial force determined can be rendered more accurate by measuring the natural frequencies by using an ultrasonic wave of a frequency (e.g., about 10 MHz) at which the natural frequency changing ratio is relatively large with respect to the axial force variation.

FIG. 5 shows a graph representing the relationship between the varying axial force and the frequency changing ratio. This frequency changing ratio is determined in such a way that the natural frequency of the aticle is measured by applying an ultrasonic frequency of some 10 MHz, which value renders the frequency changing ratio to be determined to increase steeply as the axial force increases, when the axial force is zero and when the axial force really exists within the article, respectively. These two measured values are calculated to determine the frequency changing ratio.

The data used for plotting the graph in FIG. 5 are attained by determining the frequency changing ratio using the 10 MHz of ultrasonic wave and tensile tester as commonly used, on 50 pieces of ring gear setting bolts for the automobiles. The upper and the lower curve show the upper and lower extremes of fluctuation among the 50 measurements.

Although the foregoing description has been given on a method of determining the axial force of a bolt or the like by measuring the natural frequencies thereof, it will be understood that measuring the propagation time has exactly the same significance as that of measuring the natural frequency, because the reciprocating propagation time T of ultrasonic wave in a bolt or the like can be expressed by the following formula:

$$T = 2l/v = 1/(v/2l) = 1/f$$
(8)

Namely, the axial force of a bolt or the like can of course be determined by measuring the reciprocating time of ultrasonic wave in the bolt or the like, i.e., the period from when the ultrasonic wave is projected from one end of the bolt or the like to the time when it returns to said end upon reflecting at the other end, by using, for example, an ultrasonic reflectoscope.

As described in detail herein, the method of the invention enables the axial force of bolts and the like to be determined simply, highly accurately and non-destructively by the selective use of ultrasonic waves within a specific frequency range, and therefore, can be used in a wide range, for example, for the control of the axial forces of bolts and the like in the process of manufacture or for the determination of the axial forces of bolts and the like in an assembled state which vary with time.

The method of the invention has the additional advantage that, since strain and stress are in simple relation within the limit of proportionality, all of axial force, strain and stress can be measured by virtue of ultrasonic natural frequency differential, and therefore, the method can be applied to the simple, non-destructive measurement of the stress distribution in structural members of buildings, automobiles, ships, airplanes, etc.

What is claimed is:

1. A method of obtaining a measure of an axial force within an article under strain from the natural frequency differential of said article, comprising the steps of:

applying first and second ultrasonic waves, respectively, to said article to generate forced oscillations therein;

measuring the first and second natural frequencies occurring in said article from the respective application of said first and second ultrasonic waves when said article is under a strain and the axial force within said article is greater than zero;

selecting said first ultrasonic frequency to satisfy the equation $$(f - f)/f = (1 - \nu) \cdot \frac{1 + \epsilon_1/(1 - \nu)}{1 + \epsilon_2 - 1}$$

where $f$ is the first measured natural frequency of said article when the strain thereof is $\epsilon_1$ ($\epsilon_1 \geq 0$), $f$ is the second measured natural frequency of said article when the strain thereof is $\epsilon_2$ ($\epsilon_2 > 0$), and $\nu$ is Poisson's ratio;

selecting said second ultrasonic frequency to provide a ratio of frequency change more than three times that obtained with said first ultrasonic frequency; and determining the difference between said measured first and second natural frequencies.

2. The method defined in claim 1, wherein the frequencies of said ultrasonic wave are greater than about 0.5 MHz.

3. The method defined in claim 1, wherein the frequencies of said ultrasonic wave are selected from the range of frequencies between about 0.5 MHz and 10 MHz.

4. The method defined in claim 1 comprising the further step of comparing the determined difference between said first step and second natural frequencies with a reference calibration curve in order to obtain the axial force within said article under strain.

* * * * *

UNITED STATES PATENT AND TRADEMARK OFFICE
CERTIFICATE OF CORRECTION

PATENT NO. : 3,822,587
DATED : July 9, 1974
INVENTOR(S) : MAKINO et al

It is certified that error appears in the above-identified patent and that said Letters Patent are hereby corrected as shown below:

Col. 3, between lines 5 and 10, the equation should read:

$$--f = v/2\ell = \sqrt{E/\rho}/2\ell = \sqrt{EV/M}/2\ell \quad \ldots\ldots\ldots\ldots(4)--;$$

Col. 3, lines 25 et seq., the equation should read:

$$--(f_\varepsilon - f_o)/f_o = \{\sqrt{V_\varepsilon/V_o}/(\ell_\varepsilon/\ell_o)\} - 1$$
$$= \{(1 - v\varepsilon/\sqrt{1+\varepsilon}\} - 1 \quad \ldots\ldots\ldots\ldots(5)--;$$

Col. 3, line 30, "f" should read $--f_\varepsilon--$;

line 32, "$\ell$" should read $--\ell_\varepsilon--$;

"V" should read $--V_\varepsilon--$;

line 40, the equation should read:

$$--(f_\varepsilon - f_o)/f_o = (1 - 0.3 \times 0.003)/\sqrt{1 + 0.003} - 1$$
$$\approx -0.0024 \quad \ldots\ldots\ldots\ldots(6)--;$$

line 49, the inequality should read:

$$--\varepsilon_1(\varepsilon_1 \geq 0)--;$$

UNITED STATES PATENT AND TRADEMARK OFFICE
CERTIFICATE OF CORRECTION

PATENT NO. : 3,822,587
DATED : July 9, 1974
INVENTOR(S) : MAKINO et al

It is certified that error appears in the above-identified patent and that said Letters Patent are hereby corrected as shown below:

lines 51-55, the equation should read:

$$-- (f_{\varepsilon_2} - f_{\varepsilon_1})/f_{\varepsilon_1} = \{(1 - \nu\varepsilon_2)\sqrt{1 + \varepsilon_1}/(1 - \nu\varepsilon_1)\sqrt{1 + \varepsilon_2}\} - 1 \quad ..(7) --;$$

line 61, "$f_1$ and $f_2$" should read $-- f_{\varepsilon_1}$ and $f_{\varepsilon_2} --$;

Col. 6, between lines 37 and 39, the equation should read:

$$-- (f_{\varepsilon_2} - f_{\varepsilon_1})/f_{\varepsilon_1} = \{(1 - \nu\varepsilon_2)\sqrt{1 + \varepsilon_1}/(1 - \nu\varepsilon_1)\sqrt{1 + \varepsilon_2}\} - 1 --;$$

Col. 6, line 40, "f" should read $-- f_{\varepsilon_1} --$;

lines 41-42, the inequality should read:

$$-- \varepsilon_1 (\varepsilon_1 \geq 0) --;$$

line 42, "f" should read $-- f_{\varepsilon_2} --$.

Signed and Sealed this eleventh Day of May 1976

[SEAL]

Attest:

RUTH C. MASON
Attesting Officer

C. MARSHALL DANN
Commissioner of Patents and Trademarks